UNITED STATES PATENT OFFICE.

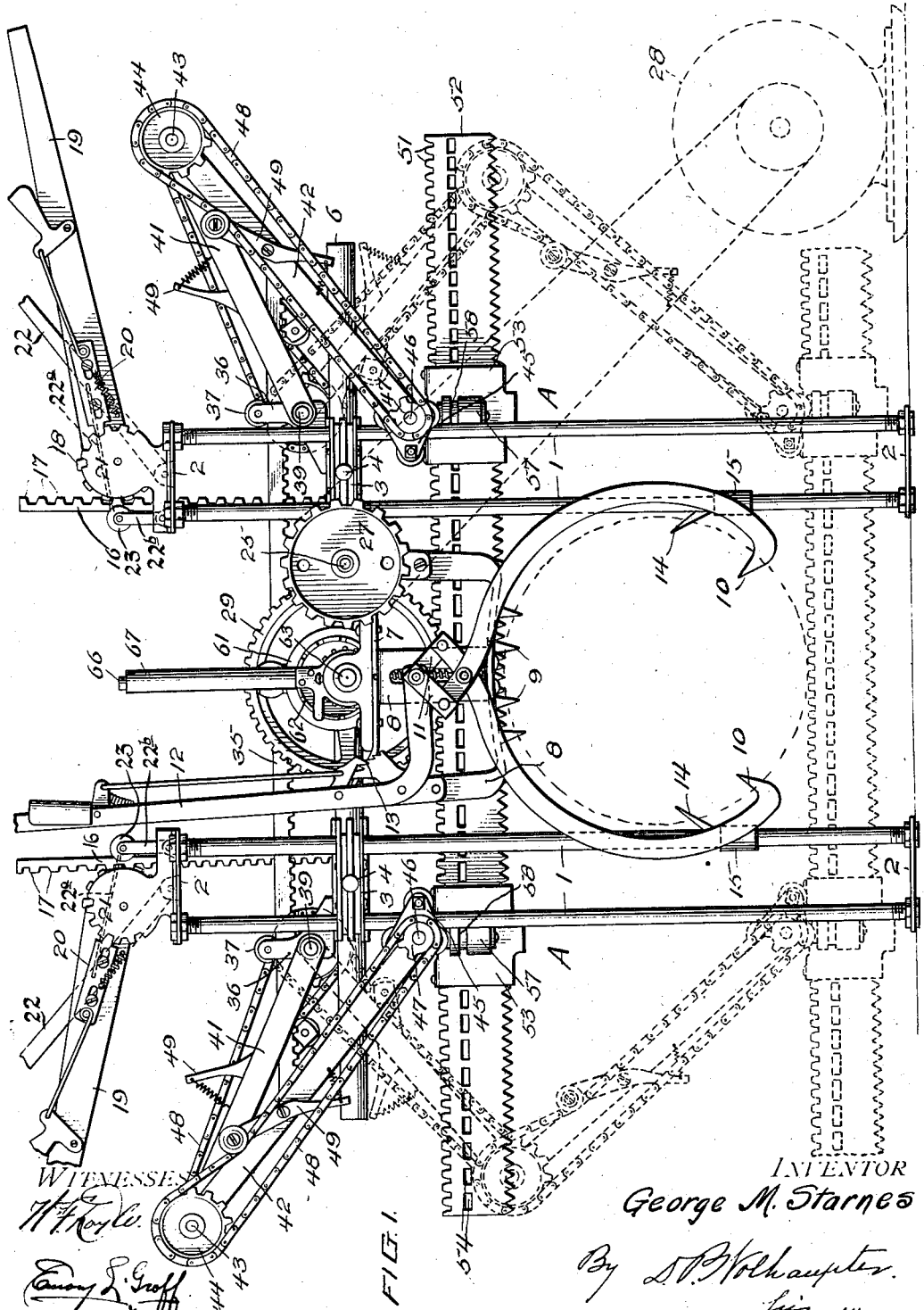

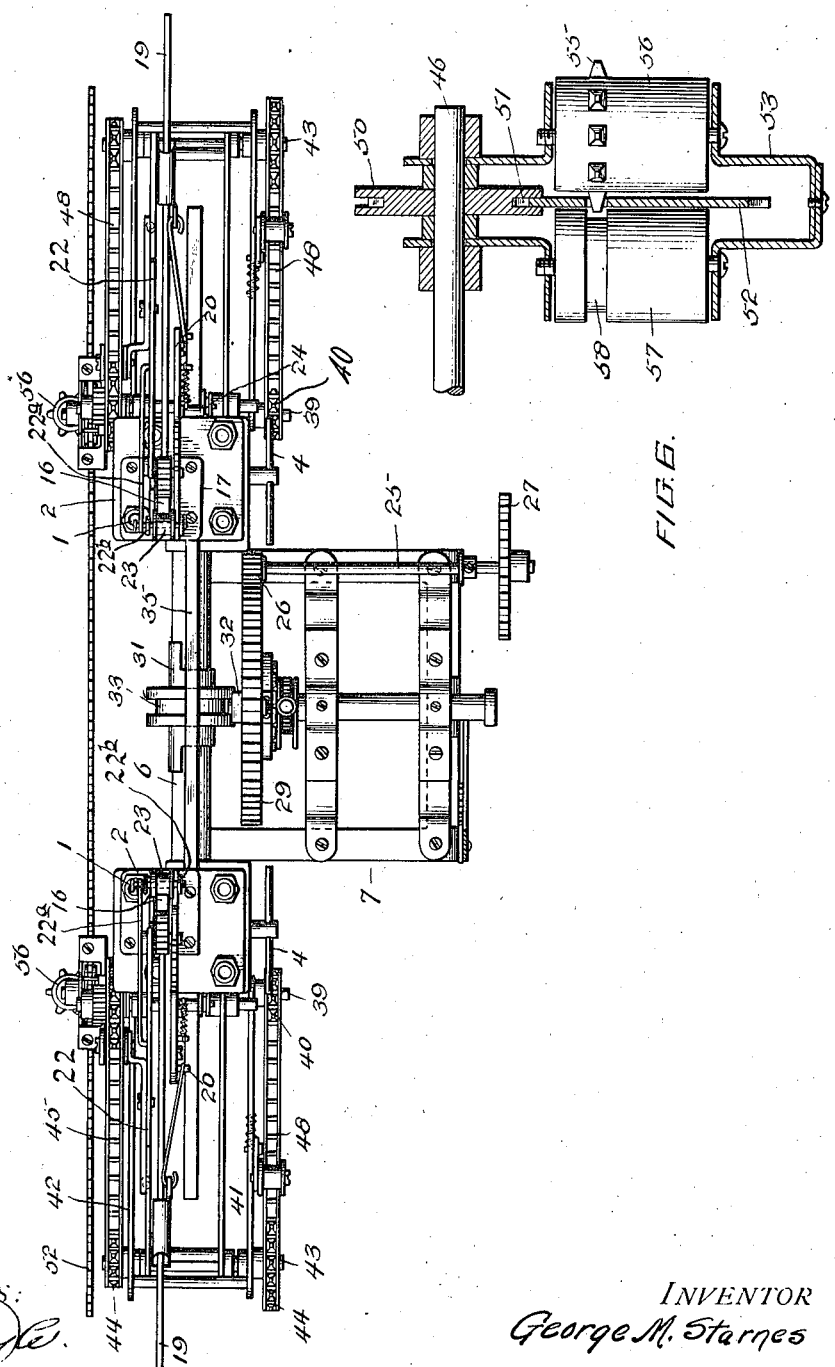

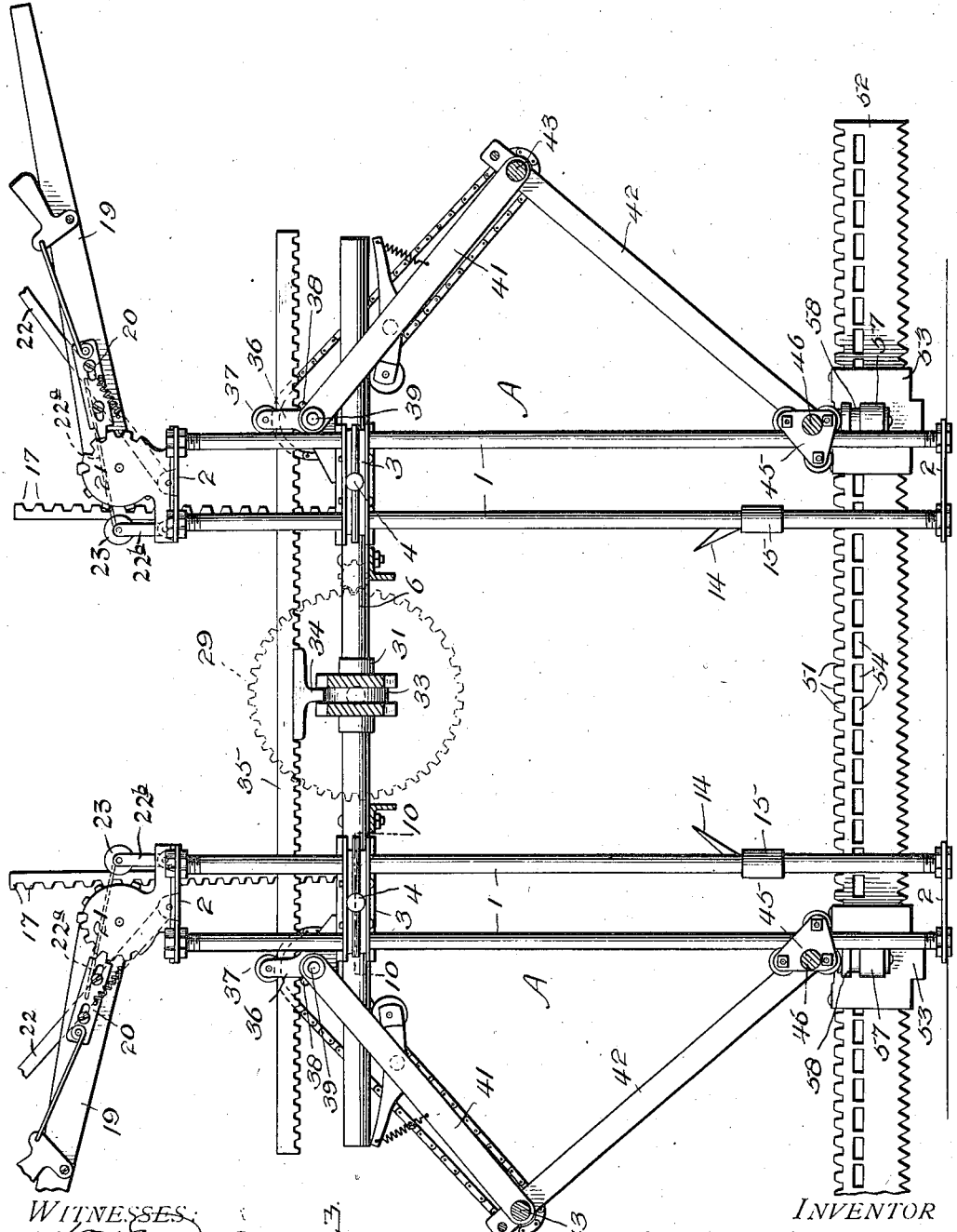

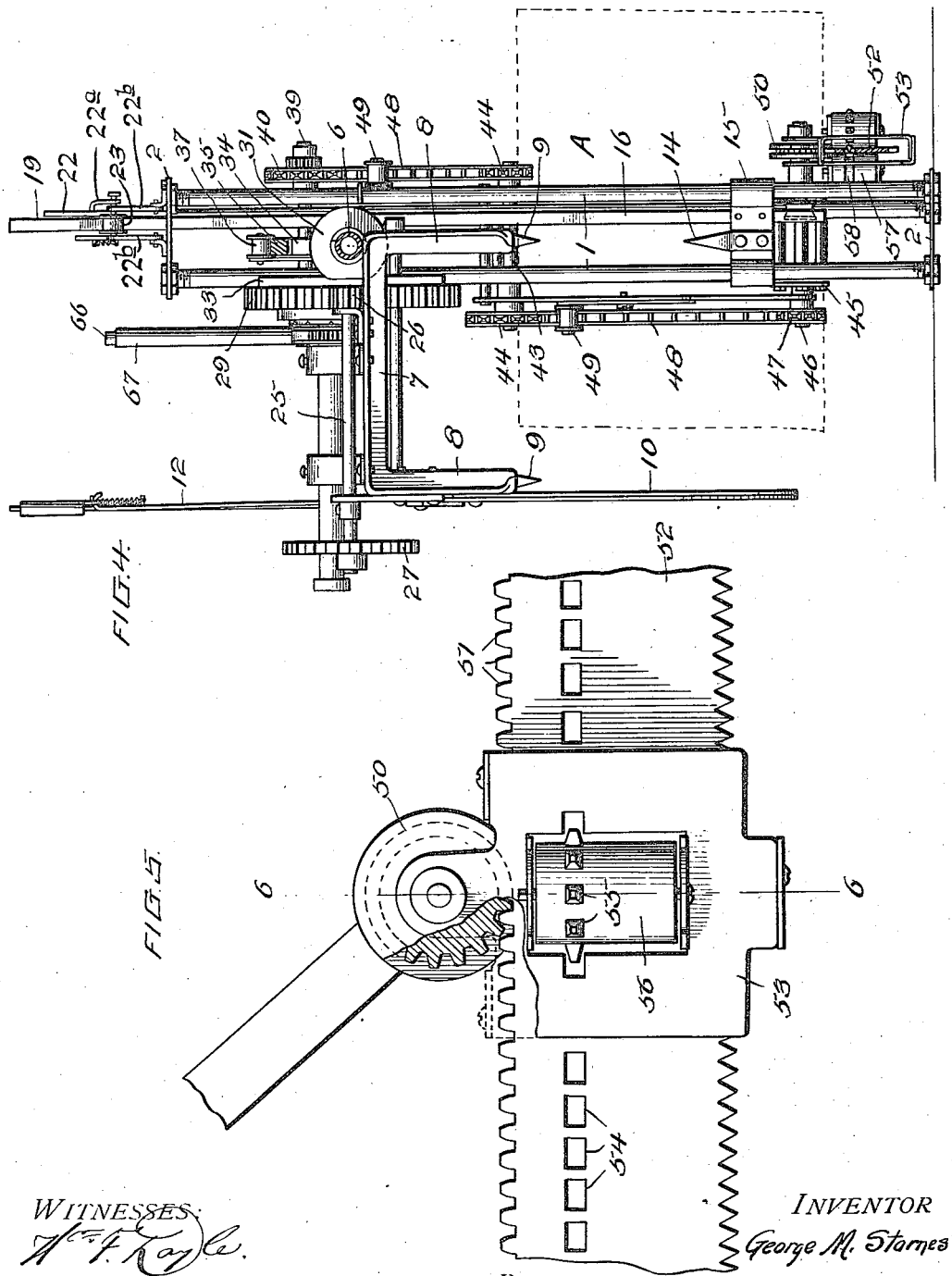

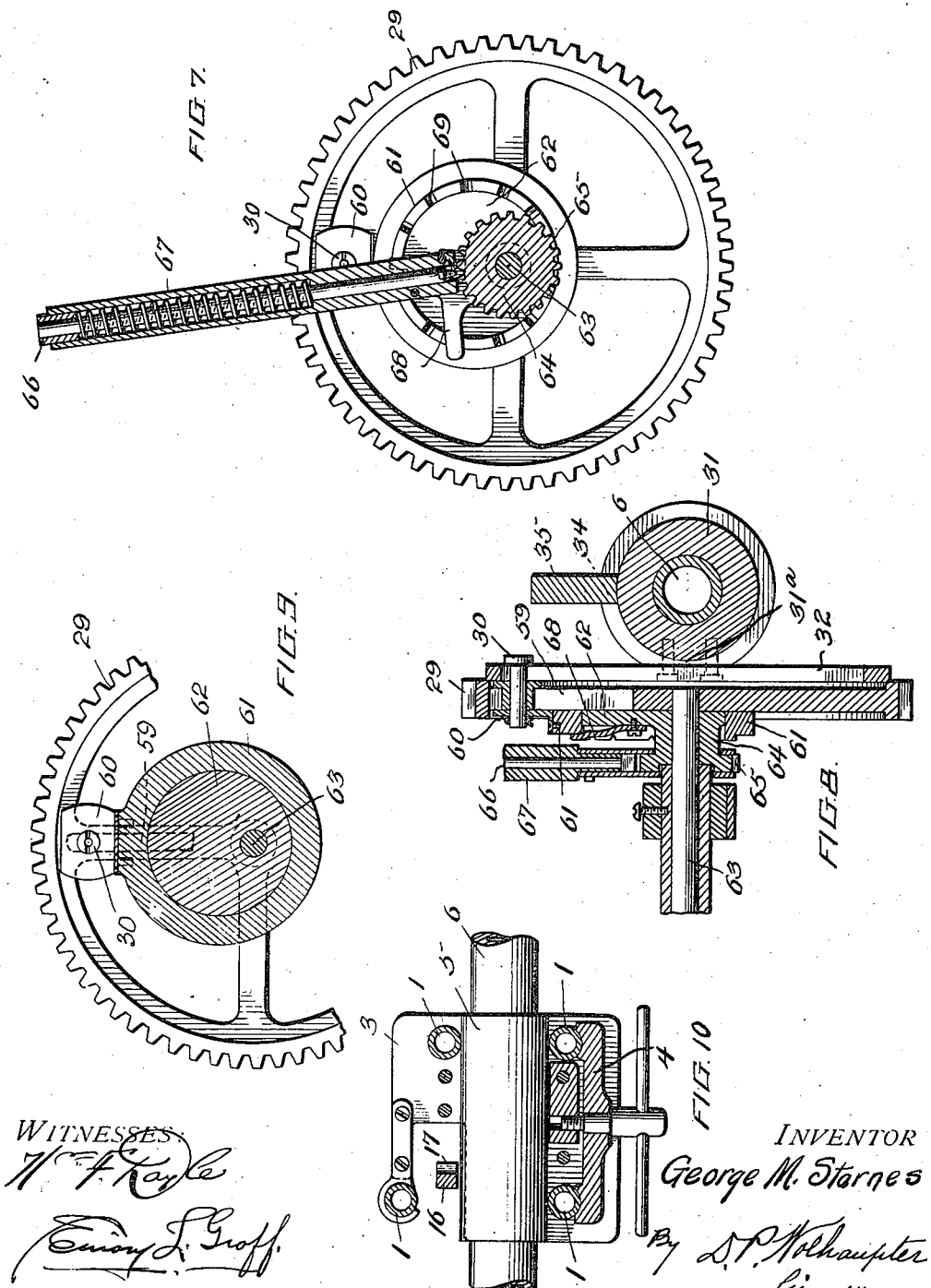

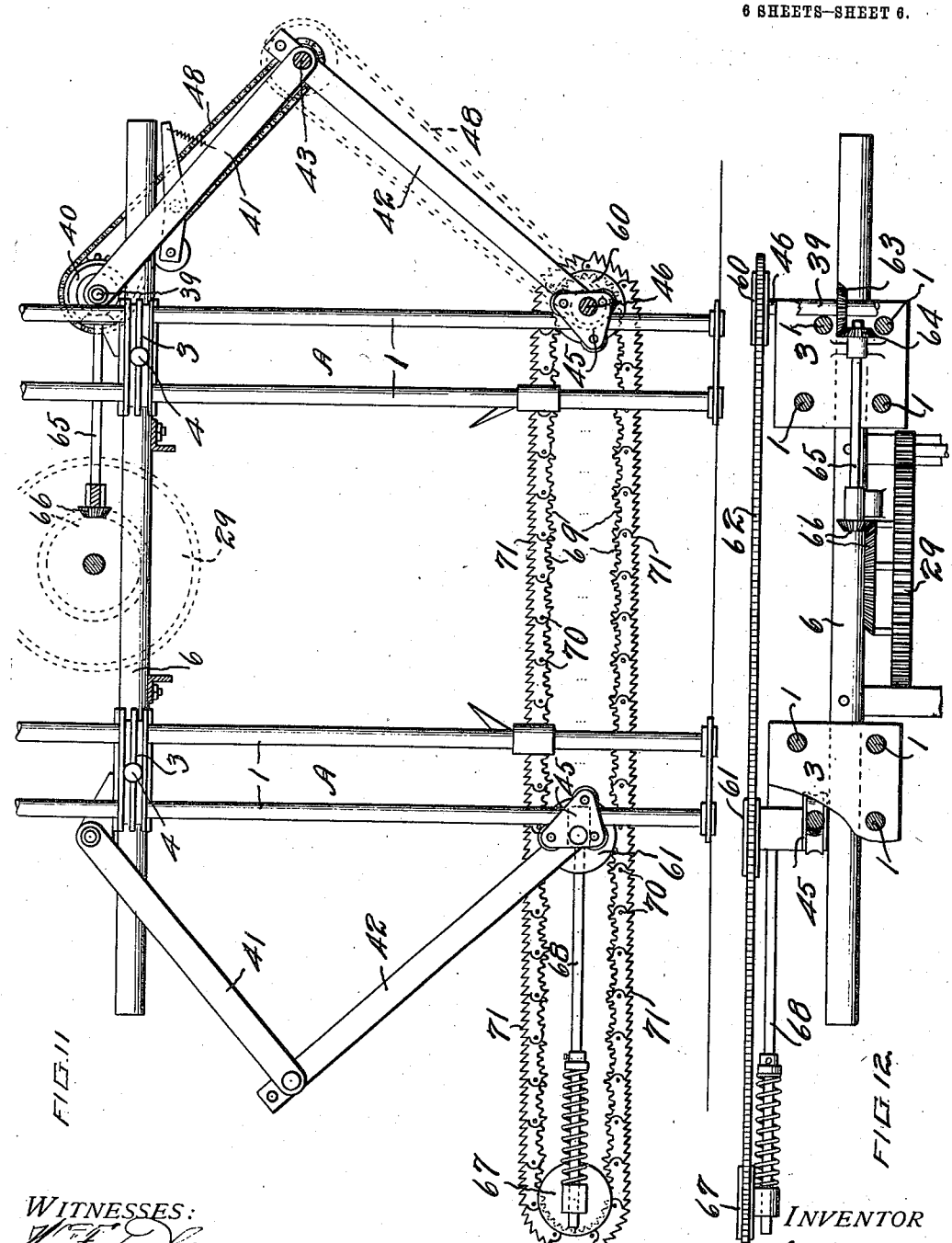

GEORGE M. STARNES, OF LITTLE ROCK, ARKANSAS.

MOTOR SAWING-MACHINE.

1,132,402.  Specification of Letters Patent.  Patented Mar. 16, 1915.

Application filed May 11, 1911. Serial No. 626,569.

*To all whom it may concern:*

Be it known that I, GEORGE M. STARNES, a citizen of the United States, residing at Little Rock, in the county of Pulaski and State of Arkansas, have invented certain new and useful Improvements in Motor Sawing-Machines, of which the following is a specification.

The present invention relates in general to saws, and more particularly to an improved sawing mechanism which embodies novel features of construction whereby it can be readily applied to a standing tree, a log, or a like object and will operate in a quick and effective manner to drive a saw blade through the same.

A further object of the invention is the provision of a device of this character which is light and compact in construction so as to be readily transported from place to place, which can be readily adjusted to accommodate various sizes of logs or other objects which it may be desired to operate upon, and which can be readily set up in operative position and connected to a portable motor.

A still further object of the invention is the provision of a motor driven sawing mechanism which can be applied to a standing tree either so close to the ground as to practically eliminate the stump or at any desired height upon the same, which can be quickly adjusted to vary the stroke of the saw blade, and which comprises few and durable parts well adapted to withstand the wear and tear to which such devices must necessarily be subjected when in use.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of the sawing mechanism, the saw blade being shown in full lines at the upper limit of its movement and in dotted lines at the lower limit of its movement. Fig. 2 is a top plan view of the same. Fig. 3 is a side elevation with the main frame and portions of the jointed connecting levers removed, the saw being shown at the lower limit of its movement. Fig. 4 is a transverse sectional view through the device. Fig. 5 is an enlarged side elevation of one of the saw guides, portions being broken away. Fig. 6 is a vertical sectional view on the line 6—6 of Fig. 5. Fig. 7 is an enlarged detail view of the main gear wheel and the stroke varying mechanism, portions being shown in section. Fig. 8 is an enlarged transverse vertical sectional view through the main gear wheel and stroke varying mechanism. Fig. 9 is an enlarged sectional view through the eccentric member of the stroke varying mechanism on the line 9—9 of Fig. 8, and Fig. 10 is an enlarged view of one of the guide members for the main frame, portions being broken away and shown in section, the line of section being line 10—10 of Fig. 3. Fig. 11 is a diagrammatic elevation partly in section, illustrating the frame construction and the driving mechanism of the invention embodied in a modification employing an endless chain-saw, instead of the reciprocating saw blade shown in the other figures. Fig. 12 of the drawings is a top plan view of the structural features shown in Fig. 11.

Corresponding and like parts are referred to in the following description and indicated in all the views of the drawings by the same reference characters.

Specifically describing the present embodiment of the invention, the letters A designate a pair of spaced and substantially parallel guide standards which are designed to receive the log or other member to be operated upon between them, each of the said guide standards being formed of a series of rods 1 which are suitably connected at their ends by the plates 2. Similar slides 3 are mounted upon the guide standards A and suitable clamps 4 are provided for locking the said slides in an adjusted position. Each of the slides 3 is formed with a sleeve 5 adapted to receive a transverse rod 6 which connects the guide standards. It will be readily obvious that this construction admits of the guide standards being moved toward or away from each other as may be required to accommodate a log or tree trunk of greater or less diameter. A main frame 7 is mounted upon the middle portion of the rod 6 and normally projects outwardly away from the plane of the standard A. The opposite ends of the main frame 7 are provided with downwardly extending rests 8 adapted to fit against the top or one side of the member being sawed. These rests 8 are preferably provided with teeth 9 adapted to bite into and grip the log. A pair of grab hooks 10 are mounted upon the outer end of the main frame 7 and are adapted to extend around the sides of the log and to grip the bottom or opposite side thereof, the said grab hooks being connected by toggle levers 11 to a controlling lever 12, and a suitable pawl and rack mechanism 13 being provided for locking the said levers in an adjusted position. The bottom of the log is also designed to be engaged by a pair of dogs 14 carried by slides 15 mounted upon the innermost guide rods 1 of the standards A. These slides 15 are connected to upwardly extending rods 16 provided with racks 17 adapted to engage the teeth 18 of levers 19, the said levers being mounted upon the upper ends of the standards A and being provided with the usual pawls 20 adapted to engage segmental racks 21 to lock the levers in position. Means are also provided whereby the racks 17 may be disengaged from the teeth 18 for the purpose of drawing the dogs 14 into an initial engagement with the log, and for this purpose release levers 22 are arranged at the upper ends of the standards A, and each of which levers has an operative connection as at 22$^a$ with a swinging pivotal carrier 22$^b$ for a double-flanged combined guide and presser roller 23 which engages the back of the rack member 17 of the rod 16. When these release levers are moved in one direction, with the levers 19 in any position, the rollers 23 are drawn adjacent to the racks 17 to bring and hold them in engagement with the teeth 18 of the levers 19, while when the release levers 22 are moved in an opposite direction the rollers 23 are eased from the rods 16 to admit of the racks 17 springing out of engagement from the teeth 18. After the latter operation the dogs 14 can be manually slid along and drawn into an initial engagement with the log. Then when the racks 17 have again been thrown into engagement with the teeth 18 in the manner explained, the levers 19 can be utilized for causing the dogs to forcibly engage the log and bite into the same. It will thus be apparent that by suitably manipulating the levers 19 and 22 the device may be caused to grip or release a log or other similar object, as may be required.

A drive shaft 25 is journaled within suitable bearings upon one side of the main frame 7 and is provided at its inner end with a pinion 26 and at its outer end with a gear wheel 27 adapted to receive power from any suitable source such as a portable motor 28. The pinion 26 meshes with a main gear wheel 29 which is also mounted upon the frame 7 and carries a wrist pin 30. A cross head 31 is slidably mounted upon the transverse rod 6 and carries from a rigid connection 31$^a$ a longitudinally grooved shifting yoke member 32 which receives an end of the wrist pin. It will thus be obvious that as the main wheel 29 is revolved the cross head 31 will be moved back and forth upon the rod 6. This cross head is also formed with an annular groove 33 loosely receiving an arm 34 which projects downwardly from the central portion of a reciprocating rack bar 35, the said rack bar being suitably mounted within guide brackets 36 upon the slides 3. Rollers 37 engage the back of the rack bar 35 while the toothed edge of the said rack bar meshes with pinions 38 carried by the slides 3. These pinions are rigid with the shafts 39 which have the gear wheels 40 applied thereto and also have the inner ends of swinging levers 41 mounted thereon. The outer ends of the levers 41 are pivotally connected to swinging levers 42 by means of a shaft 43 having gear wheels 44 rigid therewith. The opposite ends of the second levers 42 are connected to slides 45 mounted upon the outermost rods 1 of the standards A. It will thus be apparent that the jointed levers 41 and 42 can be moved toward each other or spread apart to admit of the slides 45 being moved up and down upon the guide standards A.

Transverse shafts 46 extend through the slides 45 and are provided at one end thereof with gear wheels 47, the various gear wheels 40, 44 and 47 of each of the jointed levers being connected by the chains or belts 48 and suitable belt tighteners 49 being provided for taking up any slack in the chains or belts. The opposite end of each of the shafts 46 is provided with a flanged gear wheel 50 meshing with teeth 51 upon the back of a saw blade 52. This saw blade is mounted to reciprocate back and forth through the guide members 53 which are carried by the slides 45, and the said saw blade is formed with a longitudinally extending series of openings 54 receiving teeth 55 upon guide rollers 56 engaging one side of the saw blade and journaled upon the guides 53, the opposite side of the saw blade being similarly engaged by rollers 57 which are grooved at 58 to receive projecting ends of the teeth 55 and are also journaled upon the guides 53. It will be apparent that these teeth 55 projecting transversely through the blade hold the teeth 51 at the back of the saw blade in engagement with the flanged gear wheels 50 so that when motion is imparted to the said flanged gear wheels 50 the saw will be moved longitudinally.

The invention also contemplates a novel means for varying the stroke of the saw blade whereby the said saw blade may even while running be caused to take either a long or short stroke as may be necessary or desirable. By reference to Fig. 8 it will be observed that the wrist pin 30 extends through a radial slot 59 in one of the spokes of the main gear wheel 29 and is connected to an ear 60 projecting from an eccentric ring 61 loosely surrounding an eccentric 62 which is mounted upon the shaft 63 of the main wheel 29. Integral with this eccentric is a hub 64 having a circular rack 65 at the outer end thereof, the said rack being designed to be engaged by a spring retracted pawl 66 arranged within a lever 67 pivotally mounted upon the hub 64. The end of the push button pawl 66 normally projects through the end of the lever, and when it is desired to shift the position of the eccentric 62 it is merely necessary to push inwardly upon the outer end of the spring retracted pawl 66 and cause the said inner end of the said pawl to engage the rack 65, and to then move the lever as required. It will be entirely obvious that by thus turning the eccentric 62 the wrist pin 30 can be moved in and out within the slot 59 and that the stroke of the saw will be increased as the wrist pin is moved outwardly and decreased as the wrist pin is moved inwardly that is by varying the distance of the pin from the axis of rotation. For the purpose of locking the eccentric 62 against accidental movement the said eccentric is provided with a spring arm 68 adapted to engage notches 69 in the ring 61. The best results are ordinarily attained when the saw blade has the larger amplitude of movement, although it frequently becomes necessary to shorten the stroke in order to prevent the ends of the saw from coming into contact with some object such as another tree or log.

The device is of a portable nature and is designed to be employed upon logs or standing timber as they may be found in the field or forest. When mounting the device in position the standards A are adjusted to the proper distance apart, and the slides 3 moved downwardly until the saw blade rests against the member to be sawed. The clamps 4 are then tightened to hold the slides 3 in position and the lever 12 and levers 19 properly manipulated to cause the grab hooks 10 and dogs 14 to grip the log. The portable motor 28 is then connected to the gear wheel 27 and motion thereby imparted to the main wheel 29. As has been previously described, this main wheel operates to reciprocate the rack bar 35 and this rack bar alternately turns the pinions 38 in opposite directions. From these pinions power is transmitted through the gearing upon the levers 41 and 42 to the flanged gear wheels 50 which operate directly upon the saw. The saw is thus reciprocated back and forth and the movement of the slides 45 which carry the saw guides 53 admits of the saw being fed in the necessary manner. When operating upon a log in a horizontal position, as indicated in Fig. 1 of the drawing, the weight of the saw would be sufficient to feed it forward in the required manner, although should the device be applied to a standing tree, it would be necessary to feed the blade manually, which could be conveniently accomplished by attendants holding with pressure the saw-carrying slides.

Particular attention is directed to the fact that with the above described construction the saw is always pulled from the forward ends thereof so that the operation of the saw blade is due to a pulling force instead of a pushing force. It will further be obvious that any suitable form of portable motor may be employed for driving the saw, although a portable gasolene motor is preferably employed for this purpose.

By way of illustrating the range of modification that may be resorted to in carrying out the invention, without affecting the essential features relating to the various adjustments and the means for communicating motion to the saw, there is illustrated in Figs. 11 and 12 of the drawings a construction and arrangement of parts involving the use of another type of saw. In the form of the invention already described a reciprocating saw blade is employed that is provided at one edge with a rack to engage driving gears which in turn are driven from the main driving mechanism of the machine, and it is proposed by the modification shown in Figs. 11 and 12 to provide a construction which admits of the use of either a reciprocating saw blade, such as referred to or an endless chain-saw, which has a continuous motion in one direction. In adapting the machine for operation in connection with an endless chain-saw only a few minor changes are required in the equipment and rigging of the machine. Referring more particularly to this adaptation of the machine, it will be observed by reference to Figs. 11 and 12 that no change or alternation is required in the general framework of the machine, nor in the means for accomplishing the various adjustments, nor in the means for suspending the saw through the medium of the swinging jointed levers 41 and 42. The only distinctive change or modification involved is to dispense with the sliding cross head 31, the reciprocating rack bar 35, and the particular guiding means (including rollers 56 and 57) for the reciprocating saw blade. Aside from these details the modified construction of machine, embodying the chain-saw, includes the guide standard A, the clamping slides 3, 4, and the lower saw-suspending slides 45, which carry the shafts 46 previously referred to, and upon one end of which shafts are mounted double flanged pinions 60 and 61 respectively. The pinion 61 is utilized as a guiding idler and has no driving connection therewith, while the other pinion 60 is the drive pinion for the endless chain saw 62, and is driven through the system of chains or belts, previously described, carried by one set of the jointed levers 41 and 42, said system of chains or belts being in turn driven from a sprocket wheel or gear 40 carried by a shaft 39 as previously set forth. However, in the modification herein described the shaft 39 that is utilized for driving purposes has mounted thereon a bevel gear wheel 63 meshing with a similar gear wheel 64 on a counter driving shaft 65 which is suitably geared as at 66 with the main gear wheel 29. The counter driving shaft 65 may be a flexible section of shafting, if preferred, but it is proposed that the bevel gear wheel or pinion 64 on the said shaft be splined or feathered thereto so as to have sufficient sliding movement on the shaft to not interfere with adjustments. However, this is a gearing detail that may be charged or varied to suit conditions without affecting the invention. In a line with and beyond the guiding idler 61 for the chain saw 62 there is yieldingly supported a second double flanged toothed tension idler pulley 67 for the chain-saw. The tension idler pulley is preferably slidably supported upon an outrigger bracket or arm 68, and is yieldingly held under pressure in engagement with the rack teeth 69 at the inner edge of the chain-saw. By this construction the chain saw is kept taut and under a proper working tension, and at the same time admitting of each and all of the various adjustments in the machine hereinbefore more particularly referred to. The chain-saw 62 consists of an endless series of chain links of duplicate construction and pivotally jointed as at 70. Each link is cut at its outer edge to provide saw teeth 71, while the inner edge of each link is formed with rack teeth 69 above referred to. The saw teeth 71 and the rack teeth are in continuous relation so that as the driving mechanism is operated the chain saw is continuously driven in one direction, and the saw teeth carried through the timber being cut.

Having thus described the invention, what I claim as new and desire to secure by Letters Patent, is:—

1. In a sawing machine, a frame work including supporting standards, slides mounted upon the standards and having clamping means, a main frame adjustably supported on said slides, other saw carrying slides mounted upon the standards, a saw carried by said slides, jointed levers connecting the first mentioned slides to said other slides, and saw driving mechanism carried by the main frame and operatively connected with the saw.

2. In a sawing machine, a framework including spaced standards, slides mounted upon the standards and having clamping means, a main frame adjustably supported upon said slides, other slides mounted upon the standards and having saw guides, a saw carried by said guides, jointed levers connecting the first mentioned slides to said other slides, and saw driving mechanism carried by the main frame.

3. In a device of the character described, the combination of spaced standards, slides mounted upon the standards and formed with guides, a reciprocating bar extending between the slides and operating through the guides, a main frame supported by the said slides, means upon the main frame for imparting a reciprocating movement to the bar, a saw, and an operative connection between the saw and the reciprocating bar.

4. In a device of the character described, the combination of a pair of standards adapted to fit upon opposite sides of a member to be sawed, a main frame arranged between the standards, guide brackets carried by the standards, pinions journaled upon the guide brackets, a reciprocating rack bar operating through the guide brackets and engaging the pinions, means upon the main frame for driving the reciprocating rack bar, slides mounted upon the standards and formed with saw guides, a saw mounted within the saw guides, jointed levers connecting the guide brackets to the said slides, and gearing carried by the jointed levers for transmitting power from the before mentioned pinions to the saw.

5. In a device of the character described, the combination of a pair of standards adapted to fit upon opposite sides of a member to be sawed, slides mounted upon the standards and formed with guide brackets, pinions journaled upon the guide brackets, a reciprocating rack bar operating through the guide brackets and engaging the pinions, a rod connecting the slides, a main frame mounted upon the rod, means upon the main frame for driving the reciprocating rack bar, a second set of slides mounted upon the standards and formed with saw guides, a saw blade mounted within the said saw guides, jointed levers connecting the first mentioned slides to the second mentioned slides, and gearing carried by the jointed levers for transmitting power from the pinions to the saw blade.

6. In a device of the character described, the combination of a pair of standards adapted to fit upon opposite sides of a member to be sawed, slides mounted upon the standards, means for locking the slides in an adjusted position, a rod adjustably connecting the slides to admit of the standards being moved toward or away from each other, a main frame mounted upon the rod, pinions carried by the slides, a reciprocating rack bar engaging the pinions, means upon the main frame for actuating the reciprocating rack bar, a second set of slides mounted upon the standards and formed with saw guides, a saw mounted within the saw guides, jointed levers connecting the first mentioned slides to the second mentioned slides, and gearing upon the jointed levers for transmitting motion from the pinions to the saw.

7. In a device of the character described, the combination of a pair of standards adapted to fit upon opposite sides of the member to be sawed, a transverse rod extending between the standards, a main frame mounted upon the transverse rod, a cross head slidable upon the transverse rod, means upon the main frame for actuating the cross head, a reciprocating rack bar having an operative connection with the cross head, gear wheels in engagement with opposite ends of the reciprocating rack bar, a saw blade, supporting and guiding means for the saw blade, and means for transmitting motion from the gear wheels to the saw blade.

8. In a device of the character described, the combination of a pair of spaced standards, a rod extending transversely of the standards, a cross head mounted upon the rod, a main frame mounted upon the rod, means upon the main frame for reciprocating the cross head, guide brackets toward opposite ends of the transverse rod, gear wheels upon the brackets, a reciprocating rack bar mounted within the guide brackets so as to engage the gear wheels and having an operative connection with the cross head, slides mounted upon the standards and provided with saw guides, a saw blade mounted within the guides, jointed levers connecting the guide brackets to the slides to admit of the slides moving freely upon the standards, and gearing carried by the jointed levers for transmitting motion from the gear wheels to the saw blade.

9. In a device of the character described, the combination of a pair of spaced standards, a transverse rod extending between the standards, a main frame mounted upon the transverse rod, a cross head slidably mounted upon the rod and formed with a longitudinally grooved member, a wheel mounted upon the main frame and provided with a wrist pin received within the said grooved member of the cross head, guide brackets toward opposite ends of the transverse rod, gear wheels mounted upon the guide brackets, a reciprocating rack bar having an operative connection with the cross head and mounted upon the guide bracket so as to engage the gear wheels, slides mounted upon the standards and provided with saw-guides, a saw mounted within the saw guides, jointed levers connecting the guide brackets to the slides, and gearing carried by the jointed levers for transmitting motion from the gear wheels to the saw.

10. In a device of the character described, the combination of a pair of spaced standards, slides mounted upon the standards, means for locking the slides in an adjusted position, a transverse rod connecting the slides, a main frame mounted upon the transverse rod, a cross head slidably mounted upon the transverse rod and formed with a transversely grooved portion, a wheel mounted upon the main frame and provided with a wrist pin engaging the longitudinally grooved portion of the cross head, guide brackets projecting from the slides, gear wheels mounted upon the guide brackets, a reciprocating rack bar connecting the guide brackets and engaging the gear wheels, the said rack bar having an operative connection with the cross head, a second set of slides mounted upon the standards and provided with saw guides, a saw mounted within the saw guides, jointed levers connecting the first mentioned slides to the second mentioned slides, and gearing carried by the jointed levers for transmitting motion from the gear wheels upon the guide brackets to the saw.

11. In a device of the character described, the combination of a pair of spaced standards, slides mounted upon the standards, means for locking the slides in an adjusted position, a transverse rod connecting the slides, a cross head mounted upon the transverse rod, a main frame mounted upon the transverse rod, means upon the main frame for reciprocating the cross head, gear wheels carried by the slides, a reciprocating rack bar having an operative connection with the cross head and engaging the gear wheels, a second set of slides mounted upon the standards and provided with saw guides, a saw blade mounted within the saw guides, gear wheels upon the second set of slides for driving the saw blade, jointed levers connecting the first mentioned slides to the second mentioned slides, and gearing carried by the jointed levers for transmitting motion from the gear wheels of the first mentioned slides to the gear wheels of the second mentioned slides.

In testimony whereof I hereunto affix my signature in the presence of two witnesses.

GEORGE M. STARNES.

Witnesses:
W. M. GRAHAM,
H. P. BARNES.